United States Patent
Liu et al.

(10) Patent No.: US 11,342,850 B2
(45) Date of Patent: *May 24, 2022

(54) FORWARD CONVERTER WITH SECONDARY LCD CONNECTED IN PARALLEL TO REALIZE FORWARD AND BACKWARD ENERGY TRANSMISSION

(71) Applicant: XI'AN MORDA CORE ELECTRONICS TECHNOLOGY CO., LTD, Xi'an (CN)

(72) Inventors: Shu Lin Liu, Xi'an (CN); Bo Yang, Xi'an (CN); Jun Yang, Xi'an (CN)

(73) Assignee: XI'AN MORDA CORE ELECTRONICS TECHNOLOGY CO., LTD, Xi'an (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,114

(22) Filed: Sep. 16, 2020

(65) Prior Publication Data
US 2021/0376737 A1    Dec. 2, 2021

(30) Foreign Application Priority Data
Jun. 2, 2020   (CN) .......................... 202010491546.7

(51) Int. Cl.
H02M 3/335   (2006.01)
H02M 1/08    (2006.01)
H02M 1/00    (2006.01)

(52) U.S. Cl.
CPC ....... *H02M 3/33553* (2013.01); *H02M 1/083* (2013.01); *H02M 1/0058* (2021.05)

(58) Field of Classification Search
CPC ............. H02M 3/335; H02M 3/33507; H02M 3/33523; H02M 3/33553; H02M 3/33538; H02M 3/33546; H02M 3/337
See application file for complete search history.

(56) References Cited

U.S. PATENT DOCUMENTS

| 4,172,277 | A | * | 10/1979 | Pinson | H02M 3/33546 363/124 |
| 5,986,899 | A | * | 11/1999 | Xia | H02M 3/33592 363/21.06 |
| 2006/0226816 | A1 | * | 10/2006 | Wai | H02M 1/34 323/222 |
| 2014/0062187 | A1 | * | 3/2014 | Shih | H02M 3/33561 307/17 |
| 2016/0043648 | A1 | * | 2/2016 | Usami | H02M 1/12 363/21.12 |

FOREIGN PATENT DOCUMENTS

| CN | 105915060 A | * | 8/2016 |
| JP | S-5641769 A | * | 4/1981 |
| KR | 20190104469 A | * | 9/2019 |

* cited by examiner

*Primary Examiner* — Thienvu V Tran
*Assistant Examiner* — Shahzeb K Ahmad

(57) ABSTRACT

The present disclosure provides a forward converter with secondary LCD connected in parallel to realize forward and backward energy transmission, comprising a forward converter main circuit and an energy transfer and transmission circuit. The forward converter main circuit includes a high-frequency transformer T, a switching tube S, a diode D1, a diode D2, an inductance L1, and a capacitor C1. The energy transfer and transmission circuit includes a diode D3, a capacitor C2 and an inductance L2.

6 Claims, 2 Drawing Sheets

FORWARD CONVERTER WITH SECONDARY LCD CONNECTED IN PARALLEL TO REALIZE FORWARD AND BACKWARD ENERGY TRANSMISSION

TECHNICAL FIELD

This patent disclosure relates to a field of switching power supplies, in particular to a forward converter with secondary LCD connected in parallel to realize forward and backward energy transmission.

BACKGROUND

In the numerous isolated switching power supply conversion topologies, compared with the flyback converter, the power of the forward converter is not limited by the ability of the transformer to store energy; compared with half-bridge and full-bridge converters, the forward converter uses fewer components, has simpler circuits, lower costs, and higher reliability.

Since its relatively simple structure, low cost, input and output isolation, and high operational reliability, the forward converter circuit is more suitable for application in small and medium-power power conversion occasions, and is highly concerned by the industry. However, for the single-tube forward converter, because it works in the state of forward excitation, its high-frequency transformer core is unidirectionally magnetized, and itself has no magnetic reset function, which makes it very likely to cause problems such as magnetic core saturation. The result of magnetic saturation will cause the current flowing through the switching tube to increase sharply, or even damage the switching tube, which to a large extent limits the promotion of the forward converter, so, a special magnetic reset circuit or energy transfer circuit must be added to avoid magnetic core saturation.

The main working mechanism of the magnetic reset circuit is to transfer the excitation energy during the switch off time of each cycle, which could be consumed on other devices or returned to the input power supply or transmitted to the load end. There are many types of magnetic reset circuits used in existing forward converters, which are roughly divided into three types. One is to insert a reset winding at the input end to return energy to the input power; the second is to connect reset circuits such as RCD (Residual Current Device) and LCD (Liquid Crystal Display) on the primary side of the transformer to consume energy or return to the input end; the third is to take reset measures on the secondary side to transfer energy to the output end.

But, the traditional RCD clamping circuit is relatively simple, and its shortcoming is that the excitation energy is consumed in the clamping resistor, which makes it difficult to improve the overall efficiency of the system; active clamping technology is a good method to achieve magnetic reset, but it increases the complexity, design difficulty and cost of the converter circuit; the reset method of the magnetic reset winding is mature and reliable, and the excitation energy could be returned to the input power supply, but the magnetic reset winding increases the complexity of the transformer structure and the voltage stress of the power switching tube.

The existing reset measures on the secondary side either need to increase the reset winding or circuit complexity, which increases the difficulty and cost of the design and manufacturing of the transformer or circuit; or need to use more diodes to realize energy transfer, which increases circuit losses; or it will affect the working mode of forward inductance or other electrical performance indicators, which is not conducive to high power transmission. Therefore, in order to further promoting the application of forward converters, solving the problem of magnetic reset, improving its comprehensive performance, and addressing the shortcomings of other reset methods, researching on new magnetic reset methods is a subject that needs to be continuously discussed. Therefore, the problems related to magnetic reset have always been the technical solutions that those skilled in the art have focused on to solve various problems brought about by magnetic reset.

SUMMARY

An object of the present disclosure is to provide a forward converter with secondary LCD connected in parallel to realize forward and backward energy transmission. Then problems of the existing magnetic reset circuit can be solved, such as low excitation energy utilization rate, complex circuit composition, large loss, low efficiency can be solved.

The present disclosure provides a forward converter with a secondary LCD connected in parallel to realize forward and backward energy transmission to solve technical problems of the present disclosure, comprising a forward converter main circuit (1); and an energy transfer and transmission circuit (2) connected to the forward converter main circuit (1); wherein, the forward converter main circuit (1) includes a high-frequency transformer T, a switching tube S, a diode D1, a diode D2, an inductance L1 and a capacitor C1; a first end of the primary winding of the high-frequency transformer T is the positive voltage input end IN+ of the forward converter main circuit (1), which is connected to the positive output end of the external power supply, and a second end of the primary winding of the high-frequency transformer T is connected to the drain of the switching tube S; the source of the switching tube S is the negative voltage input end IN− of the forward converter main circuit (1), which is connected to the negative output end of the external power supply; the gate of the switching tube S is connected to the output end of the external controller; the first end of the secondary winding of the high-frequency transformer T is connected to the anode of the diode D1, the cathode of the diode D1 is connected to the cathode of the diode D2 and one end of the inductance L1; the other end of the inductance L1 is connected to one end of the capacitor C1 and is the positive voltage output end OUT+ of forward converter main circuit (1); the second end of the secondary winding of the high-frequency transformer T is connected to the anode of the diode D2 and the other end of the capacitor C1 and is the negative voltage output end OUT− of the forward converter main circuit (1); the negative voltage output end OUT− of the forward converter main circuit (1) is grounded; the energy transfer and transmission circuit (2) includes a diode D3, a capacitor C2 and an inductance L2; the anode of the diode D3 is connected to the anode of the diode D2, the cathode of the diode D3 is connected to one end of the capacitor C2, the other end of the capacitor C2 is connected to the anode of the diode D1, one end of the inductance L2 is connected to the cathode of the diode D3, the other end of the inductance L2 is connected to the positive voltage output end OUT+ of forward converter main circuit (1).

In one embodiment, the diodes D1 and D2 are fast recovery diodes.

In one embodiment, the switching tube S is a fully-controlled power semiconductor device.

In one embodiment, the capacitor C2 of the forward converter with secondary LCD connected in parallel to realize forward and backward energy transmission is selected according to the first selection step; wherein the steps of the first selection step include: step 101, selecting the capacitance $C_2$ of the capacitor C2 of energy storage; step 102, combining the input voltage $V_1$ of the converter and turns ratio n of transformer to calculate the withstand voltage $V_{C2,Ton}$ of the capacitor C2 of energy storage; step 103, selecting the capacitor of energy storage with a capacitance $C_2$ and a withstand voltage greater than $V_{C2,Ton}$.

In one embodiment, the inductance L2 of the forward converter with secondary LCD connected in parallel to realize forward and backward energy transmission is selected according to the second selection step; wherein the steps of the second selection step include: step 201, determining the value range of the inductance $L_2$ of the inductance L2; step 202, determining the current of the inductance L2; step 203, selecting the inductance according to the steps 201 and 202.

In one embodiment, the diode D3 of the forward converter with secondary LCD connected in parallel to realize forward and backward energy transmission are selected according to the third selection step; wherein the steps of the third selection step include: step 301, calculating the maximum current $I_{D3,max}$ flowing through the diode D3; step 302, calculating the withstand voltage $V_{D3,max}$ of the diode D3; step 303, selecting the diode according to the steps 301 and 302.

Compared with the prior art, the present disclosure has the following advantages:

1. the excitation energy is transferred to the load side, which improves the utilization rate of transformer excitation energy and improves the overall efficiency of the converter;

2. the present disclosure is high in working stability and reliability, low in power consumption, the circuit structure of the present disclosure is simple, which is easy to promote;

3. the reverse recovery problem of the diode D1 and D2 could be eliminated, which reduces the diode loss and further improves the efficiency of the converter;

4. the switching tube S could be switched off at low voltage or even zero voltage, which reduces the loss of the circuit;

5. compared with the auxiliary winding reset, the present disclosure reduces the design difficulty of the transformer;

6. L2 is easier to work in CCM, the auxiliary circuit has more power than the main circuit and no diode conduction loss, which helps to achieve high power output;

7. compared with most of the existing secondary-side magnetic reset forward converters, the present disclosure could make the forward inductance work in continuous conduction mode. Compared with the traditional forward converter, the present disclosure could be applied to larger power occasions;

8. forward energy could also be transmitted by the energy transfer and transmission circuit of the present disclosure, which is suitable for high-power applications;

9. Once the present disclosure is used in a switching power supply, the working safety and reliability of the switching power supply is higher, the energy transfer and transmission circuit could improve the energy utilization rate, which could be widely used in the fields of computers, medical communications, industrial control, aerospace equipment, etc. Therefore, the present invention has a higher value of promotion and application;

In summary, the circuit structure of the present disclosure is simple, the implementation is convenient and the cost is low. And, the working mode of the present disclosure is simple, the working stability and reliability are high, the service life is long. Moreover, the power consumption is low, the transformer utilization rate is high, the energy transmission efficiency is high. Furthermore, the working safety and reliability of the power supply of the switch could be improved, and the value of promotion and application is high.

The above and other features, examples and their implementations are described in greater detail in the description, the drawings, and the claims.

1: forward converter main circuit; 2: energy transfer and transmission circuit.

DETAILED DESCRIPTION

Figure 1:
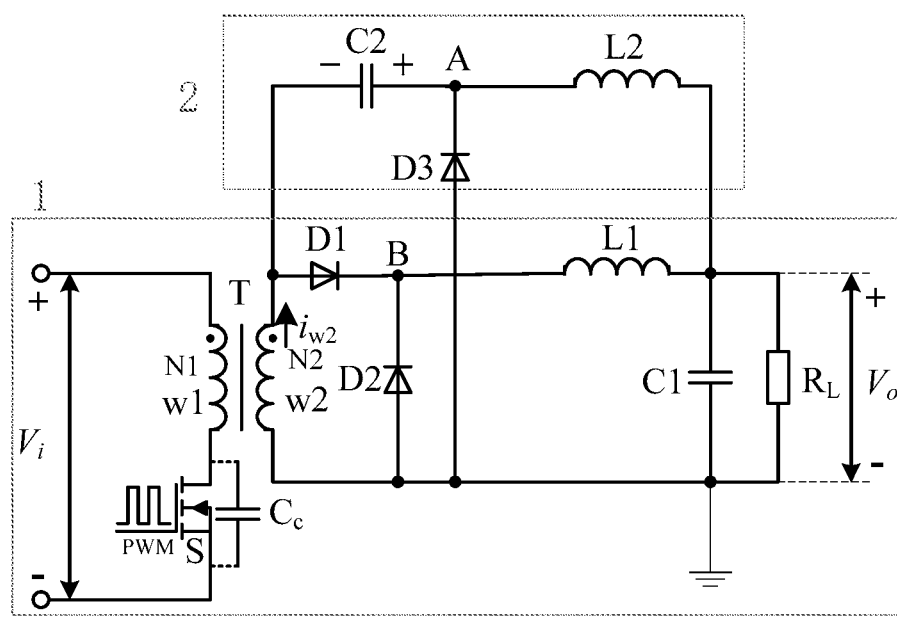
FIG. 1 is a circuit schematic diagram of the forward converter with secondary LCD connected in parallel to realize forward and backward energy transmission of the present disclosure.
Figure 2:
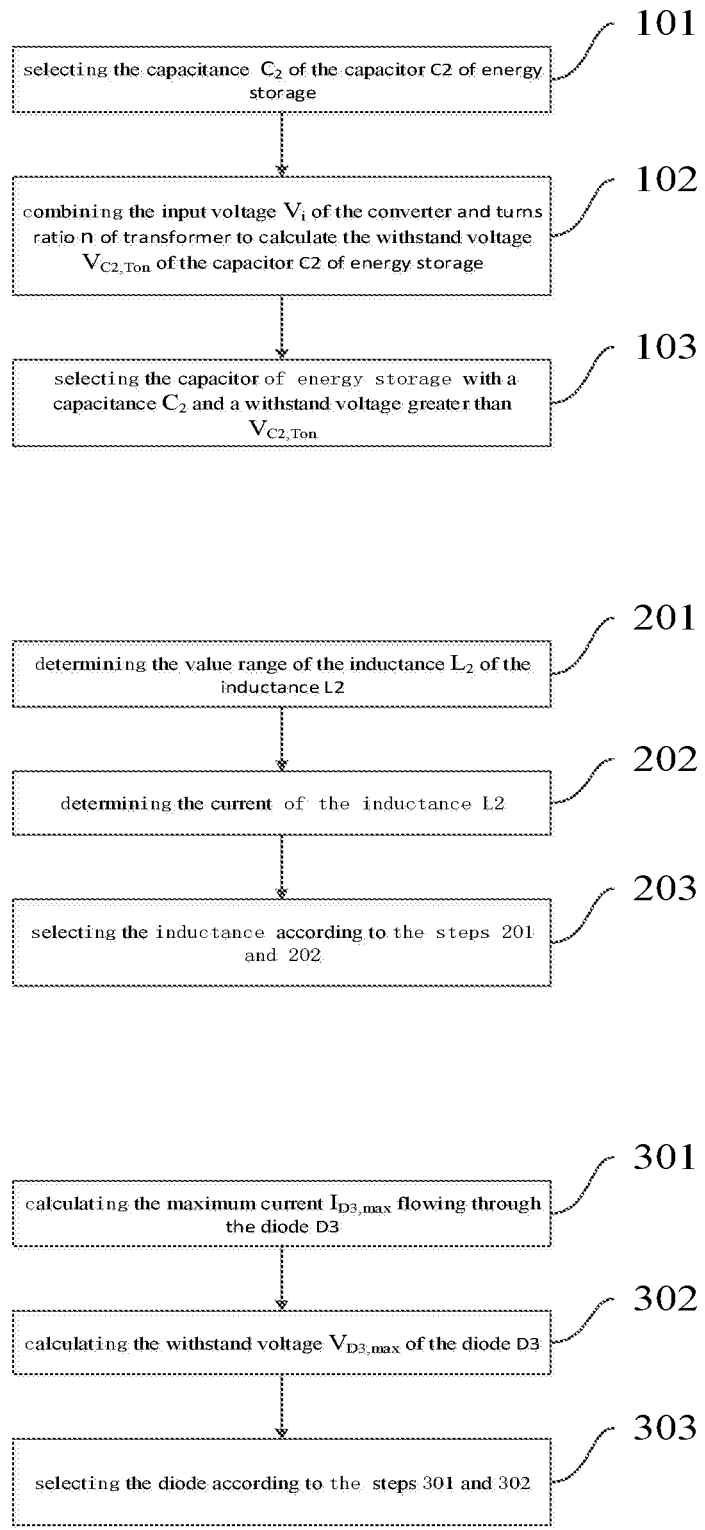
FIG. 2 is flow charts of methods for selecting a capacitor C2, an inductance L2, and a diode D3 of the forward converter with secondary LCD connected in parallel to realize forward and backward energy transmission according to one embodiment of the present disclosure.

As shown in FIGS. 1-2, in one embodiment, the present disclosure provides a forward converter with secondary LCD connected in parallel to realize forward and backward energy transmission, comprising a forward converter main circuit 1; and an energy transfer and transmission circuit 2 connected to the forward converter main circuit 1; wherein, the forward converter main circuit 1 includes a high-frequency transformer T, a switching tube S, a diode D1, a diode D2, an inductance L1 and a capacitor C1; the first end of the primary winding of the high-frequency transformer T is the positive voltage input end IN+ of the forward converter main circuit 1, which is connected to the positive output end of the external power supply, and the second end of the secondary winding of the high-frequency transformer T is connected to the drain of the switching tube S; the source of the switching tube S is the negative voltage input end IN− of the forward converter main circuit 1, which is connected to the negative output end of the external power supply; the gate of the switching tube S is connected to the output end of the external controller; the first end of the primary winding of the high-frequency transformer T is connected to the anode of the diode D1, the cathode of the diode D1 is connected to the cathode of the diode D2 and one end of the inductance L1; the other end of the inductance L1 is connected to one end of the capacitor C1 and is the positive voltage output end OUT+ of forward converter main circuit 1; the second end of the secondary winding of the high-frequency transformer T is connected to the anode of the diode D2 and the other end of the capacitor C1 and is the negative voltage output end OUT− of the forward converter main circuit 1; the negative voltage output end OUT− of the forward converter main circuit 1 is grounded; the energy transfer and transmission circuit 2 includes a diode D3, a capacitor C2 and an inductance L2; the anode of the diode D3 is connected to the anode of the diode D2, the cathode of the diode D3 is connected to one end of the capacitor C2, the other end of the capacitor C2 is connected to the anode of the diode D1, one end of the inductance L2 is connected to the cathode of the diode D3, the other end of the inductance L2 is connected to the positive voltage output end OUT+ of forward converter main circuit 1.

Specifically, the load RL is connected between the positive voltage output end OUT+ and the negative voltage output end OUT− of the forward converter main circuit 1. In the forward converter main circuit 1, both the inductance L1 and the capacitor C1 are used for filtering.

In one embodiment, the diode D1 is a rectifier diode, and the diode D2 is a fast recovery diode. The diode D2 is used for freewheeling.

In one embodiment, the switching tube S is an NMOS switching tube.

The working principle of this embodiment is:

Before analyzing the working principle of this embodiment, it is assumed that the forward inductance L1 works in CCM, the auxiliary inductance L2 and the transformer secondary inductance Lw2 work in DCM. The working principle of this embodiment is analyzed in the present disclosure, which is divided into the off period and the on period of the switching tube. In order to facilitate the introduction of the principle, the convention is as follows: for C2, the voltage is assumed to be a forward voltage when the left voltage of C2 is negative and the right voltage of C2 is positive, the voltage is assumed to be a reverse voltage when the left voltage of C2 is positive and the right voltage of C2 is negative; for the secondary winding w2, the current is assumed to be a forward current when the current of w2 is from bottom to top, the current is assumed to be a reverse current when the current of w2 is from top to bottom.

1. The working principle during the off period of the switching tube S

It is assumed that before the switching tube is switched off, the reverse voltage of C2 is risen to the maximum value, the current of inductance L1, L2 and Lw2 is risen to the maximum value. D1 is switched on, while D2 and D3 are switched off.

Stage 1: the switching tube is switched off at low voltage

In the process of the switching tube passing from the conduction to the shutdown, the parasitic capacitance of the switching tube is charged by the excitation current and secondary reflected current, the primary voltage and secondary voltage of the transformer is decreased. Once the secondary voltage is decreased to be equal to the reverse voltage of C2, this stage is over. At this stage, the voltage borne by the switching tube is Vi-nVC2 (Vi is input voltage, VC2 is the maximum reverse voltage of C2, n is the transformer ratio), so the voltage borne by the switching tube is much smaller than Vi, and the switching tube is switched off at low voltage (under certain parameters, zero voltage shutdown can also be achieved). At this stage, D1 is kept on, while D2 and D3 are switched off.

Stage 2: the reverse energy storage of capacitor C2 is released

After the secondary voltage is decreased to be equal to the reverse voltage of C2, D3 is switched on, the inductance L2 begins to be freewheeled, the reverse energy storage of capacitor C2 begins to be released. At this time, D1 is kept on, and the reverse energy storage of C2 is released through two loops: one is that the reverse energy storage of C2 is released through D1, L1, RL, and D3, which makes the diode D1 not switch off immediately, while D2 is still kept off; the other is that the reverse energy storage of C2 is released through W2 and D3. The capacitor C2 is discharged until the reverse voltage is dropped to zero, the primary voltage and the secondary voltage of the transformer is also decreased to zero at the same time, D3 is kept on, the reverse energy storage of C2 is released completely, and this stage is over. At this stage, after the reverse energy storage of C2 being dropped to zero, D1 and D2 are commutated naturally. Therefore, D1 is switched off at zero voltage and zero current, while D2 is switched on at zero voltage and zero current.

Stage 3: the forward energy of capacitor C2 is stored (continuous flow is provided by L1 and L2 at the same time)

After the reverse voltage of the capacitor C2 being dropped to zero, D3 is kept on, continuous flow continues to be provided by L2, the capacitor C2 is charged forward by the reverse current of secondary winding of the transformer, the forward voltage of C2 begins to be increased from zero. At this stage, D2 is switched on, continuous flow provided by L1 is stopped when the current of inductance L1 is dropped to zero, this stage is over.

Stage 4: the forward energy of capacitor C2 is stored (continuous flow is only provided by L2)

After the current of inductance L1 being dropped to zero, D3 is remained on, and the inductance L2 is freewheeled through D3 and the current of inductance L2 is decreased linearly. The reverse current of the secondary winding of the transformer continues to be decreased and the capacitor C2 continues to be charged. Until the next switch-on period comes, the current of L2 is dropped to the minimum value, at this time, the reverse current of the secondary winding is also drops to the minimum value, the forward voltage of C2 is reached the maximum value, and this stage is over.

2. The working principle during the on period of the switching tube S

Stage 1: the forward energy storage of capacitor C2 is released

After the switching tube is switched on, the input voltage Vi is applied to across the primary winding of the transformer, and the voltage coupled to the secondary winding w2 is positive at the top and negative at the bottom, D1 is switched on, and the forward excitation energy is transferred to the load through the two branches. One is that the forward excitation energy is transferred to the load through D1 and L1, the current of L1 is risen linearly; the other is that the forward excitation energy is transferred to the load through C2 and L2, the current of L2 is risen linearly. At this stage, the excitation energy storage of C2 is released from the maximum value, and the forward voltage of C2 is gradually decreased until the forward voltage of capacitor C2 is dropped to zero, and this stage is over.

Stage 2: the reverse energy of capacitor C2 is stored

After the forward voltage of capacitor C2 being dropped to zero, D1 is remained on and the current of L1 continues to be risen linearly. C2 begins to be charged in reverse from zero, and the current of L2 continues to be risen. In order to transmit the high power by the branch of L2 (which could reduce the loss of diode), the current of L2 has been being risen during the on-period. When the switching tube is switched off, the currents of L1 and L2 are reached the maximum value, and the voltage across C2 is reached the maximum value in reverse direction, preparing for the switch-off at low voltage. This stage is over.

In this embodiment, the capacitor C2 is selected according to the first selection step; the steps of the first selection step include:

step 101, selecting the capacitance £ of the capacitor C2 of energy storage according to the following formula:

$$\frac{4(1-d)^2 n^2}{L_m \pi^2 f^2} \le C_2 \le \frac{n^2(1-d)^2}{L_m f^2 (\arcsin \lambda)^2};$$

step 102, calculating the withstand voltage $V_{C2,Ton}$ of the capacitor C2 of energy storage according to the following formula:

$$V_{C2,Ton} = \frac{V_i dT \sin(w(1-d)T)}{\sqrt{L_m C_2} \cdot [1 - \cos(w(1-d)T)]};$$

In the above formulas, the $V_i$ is the input voltage of the forward converter main circuit 1, the d is the duty ratio of the switching tube S, the n is the turns ratio of the primary winding and the secondary winding of the high-frequency transformer T, $L_m$ is the excitation inductance of the primary winding of the high-frequency transformer T, f is the operating frequency of the forward converter main circuit 1, $\lambda$ is generally takes $0.8 \leq \lambda \leq 1$.

step 103, selecting the second capacitor for energy storage with a capacitance $C_2$ and a withstand voltage greater than $V_{C2,Ton}$.

In this embodiment, the inductance L2 is selected according to the second selection step; wherein the steps of the second selection step include:

step 201, determining the value range of the inductance $L_2$ of the inductance L2 according to the following formula:

$$L_2 = \min(L_{2,min1}, L_{2,min2})$$

In the above formula, the minimum value $L_{2,min1}$ and $L_{2,min1}$ of inductance L2 is calculated according to the following formulas:

$$L_{2,min1} = \frac{1}{C_2} \left[ \frac{V_o(1-d)T}{\left(V_{C2,Ton} + \frac{V_i - nV_o}{n}\right) \sin\left(\frac{dT}{\sqrt{L_2 C_2}}\right)} \right]^2$$

$$L_{2,min2} = \frac{1}{C_2} \left[ \frac{dT}{\arccos\left[\frac{V_i - nV_o}{(nV_{C2,Ton} + V_i - nV_o)}\right]} \right]^2$$

The $V_o$ is the output voltage of the forward converter main circuit 1;

step 202, determining the maximum current of the inductance L2 according to the following formula:

$$I_{L2,min} = \frac{\sqrt{\frac{C_2}{L_2}} \cdot \left(V_{C2,Ton} + \frac{V_i - nV_o}{n}\right) \cdot \sin\left(\frac{dT}{\sqrt{L_2 C_2}}\right) - \frac{V_o}{L_2}(1-d)T}{1 - \cos\left(\frac{dT}{\sqrt{L_2 C_2}}\right)};$$

step 203, selecting the inductance according to the steps 201 and 202.

In this embodiment, the diode D3 is selected according to the third selection step; the steps of the third selection step include:

step 301, calculating the maximum current $I_{D3,max}$ flowing through the diode D3 according to the following formula:

$$I_{D3,max} = I_{L1,max} + I_{L2,max} = \frac{V_{i,max} - nV_o}{nL_1} dT + \frac{V_o}{L_2}(1-d)T +$$

$$\frac{\sqrt{\frac{C_2}{L_2}} \cdot \left(V_{C2,Ton} + \frac{V_{i,max} - nV_o}{n}\right) \cdot \sin\left(\frac{dT}{\sqrt{L_2 C_2}}\right) - \frac{V_o}{L_2}(1-d)T}{1 - \cos\left(\frac{dT}{\sqrt{L_2 C_2}}\right)}$$

step 302, calculating the withstand voltage $V_{D3,max}$ of the diode D3 according to the following formula:

$$V_{D3,max} = V_{C2,Ton} + \frac{V_i}{n} = \frac{V_{i,max} dT \sin(w(1-d)T)}{\sqrt{L_m C_2} \cdot [1 - \cos(w(1-d)T)]} + \frac{V_{i,max}}{n}$$

$I_{L1,max}$ is the maximum current flowing through the primary winding of the high-frequency transformer T, $I_{L2}$ is the current flowing through the inductance L2;

step 303, selecting the diode according to the steps 301 and 302;

It should be understood that the above description is merely to illustrate the feasibility of the technical solution of the present disclosure, and the principles and corresponding formulas of one of the listed working modes are not the only and limited descriptions, and are only used for reference.

It should be particularly noted that the above embodiments are only used to illustrate the technical solutions of the present disclosure, not to limit them. For those skilled in the art, the technical solutions described in the above embodiments may be modified, or some of the technologies features are equivalently replaced; and all these modifications and replacements should fall within the scope of protection of the appended claims of the present disclosure.

What is claimed is:

1. A forward converter with a secondary LCD connected in parallel to realize forward and backward energy transmission, comprising:
   a forward converter main circuit (1); and
   an energy transfer and transmission circuit (2) connected to the forward converter main circuit (1);
   wherein, the forward converter main circuit (1) includes:
   a high-frequency transformer (T);
   a switching tube (S);
   a first diode (D1);
   a second diode (D2);
   an first inductance (L1); and
   a first capacitor (C1); and
   wherein, a first end of a primary winding of the high-frequency transformer (T) is a positive voltage input end (IN+) of the forward converter main circuit (1), which is connected to a positive output end of the external power supply, and a second end of the primary winding of the high-frequency transformer (T) is connected to a drain of the switching tube (S); a source of the switching tube (S) is a negative voltage input end (IN−) of the forward converter main circuit (1), which is connected to a negative output end of the external power supply; a gate of the switching tube (S) is connected to an output end of the external controller; a first end of a secondary winding of the high-frequency transformer (T) is connected to the anode of the first diode (D1), the cathode of the first diode (D1) is connected to the cathode of the second diode (D2) and one end of the first inductance (L1); the other end of the first inductance (L1) is connected to one end of the first capacitor (C1) and a positive voltage output end (OUT+) of forward converter main circuit (1); a second end of the secondary winding of the high-frequency transformer (T) is connected to the anode of the second diode (D2) and the other end of the first capacitor (C1) and is a negative voltage output end (OUT−) of the forward converter main circuit (1); the negative voltage output end (OUT−) of the forward converter main circuit (1) is grounded;

wherein, the energy transfer and transmission circuit (2) includes:
a third diode (D3);
a second capacitor (C2); and
an second inductance (L2); and
wherein, the anode of the third diode (D3) is connected to the anode of the second diode (D2), the cathode of the third diode (D3) is connected to one end of the second capacitor (C2), the other end of the second capacitor (C2) is connected to the anode of the first diode (D1), one end of the second inductance (L2) is connected to the cathode of the third diode (D3), the other end of the second inductance (L2) is connected to the positive voltage output end (OUT+) of forward converter main circuit (1);

wherein the second capacitor (C2) of the forward converter with secondary LCD connected in parallel to realize forward and backward energy transmission is selected according to a first selection step; wherein the steps of the first selection step include:

step 101, selecting the capacitance ($C_2$) of the second capacitor (C2) of energy storage;

step 102, combining an input voltage ($V_i$) of the converter and a turns ratio (n) of transformer to calculate a withstand voltage ($V_{C2,Ton}$) of the second capacitor (C2) for energy storage;

step 103, selecting the capacitor of energy storage with the capacitance ($C_2$) and the withstand voltage greater than ($V_{C2,Ton}$).

2. The forward converter with the secondary LCD connected in parallel to realize forward and backward energy transmission as in claim 1, wherein the first diode (D1) and the second diode (D2) are fast recovery diodes.

3. The forward converter with the secondary LCD connected in parallel to realize forward and backward energy transmission as in claim 1, wherein the switching tube (S) is a fully-controlled power semiconductor device.

4. The forward converter with the secondary LCD connected in parallel to realize forward and backward energy transmission as in claim 1, wherein the second inductance (L2) of the forward converter with secondary LCD connected in parallel to realize forward and backward energy transmission is selected according to a second selection step; wherein the steps of the second selection step include:

step 201, determining a value range of an inductance ($L_2$) of the second inductance (L2);

step 202, determining a current of the second inductance (L2);

step 203, selecting the second inductance according to the steps 201 and 202.

5. The forward converter with the secondary LCD connected in parallel to realize forward and backward energy transmission as in claim 4, wherein the third diode (D3) of the forward converter with secondary LCD connected in parallel to realize forward and backward energy transmission are selected according to a third selection step; wherein the steps of the third selection step include:

step 301, calculating a maximum current ($V_{D3,max}$) flowing through the diode (D3);

step 302, calculating a second withstand voltage ($V_{D3,max}$) of the diode (D3);

step 303, selecting the third diode according to the steps 301 and 302.

6. The forward converter with the secondary LCD connected in parallel to realize forward and backward energy transmission as in claim 1, wherein the third diode (D3) of the forward converter with secondary LCD connected in parallel to realize forward and backward energy transmission are selected according to a third selection step; wherein the steps of the third selection step include:

step 301, calculating a maximum current ($I_{D3,max}$) flowing through the third diode (D3);

step 302, calculating a second withstand voltage ($V_{D3,max}$) of the third diode (D3);

step 303, selecting the third diode according to the steps 301 and 302.

* * * * *